Jan. 8, 1924. 1,479,870
J. A. PAYETTE
CHAIN MAKING MACHINE
Filed Jan. 25, 1922 7 Sheets-Sheet 4
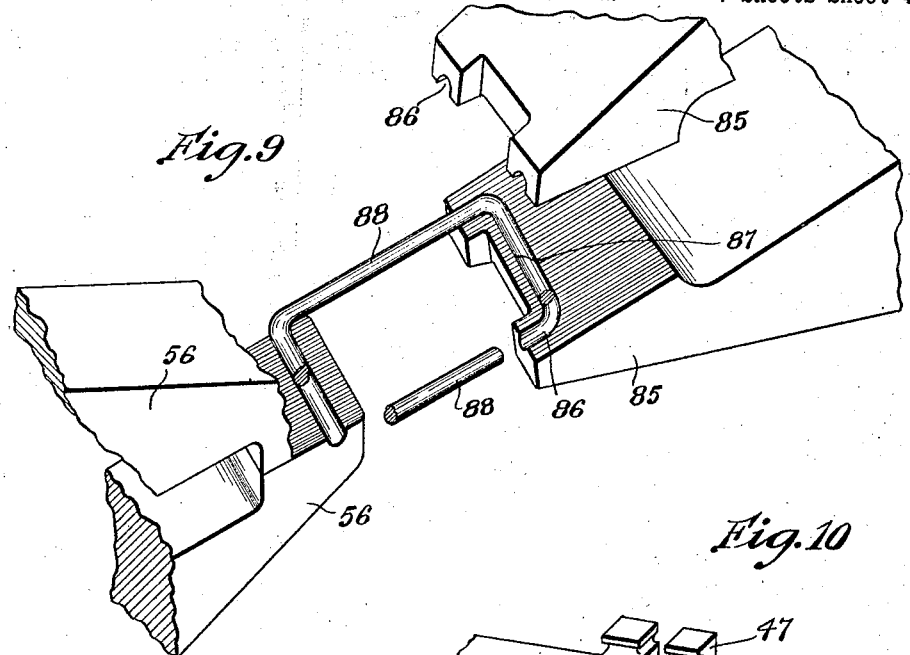
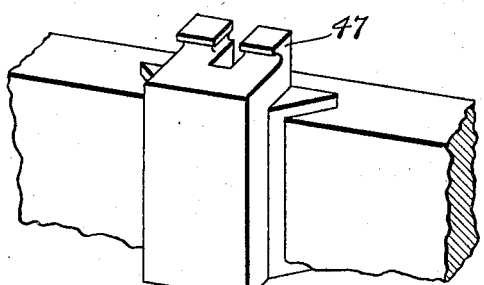
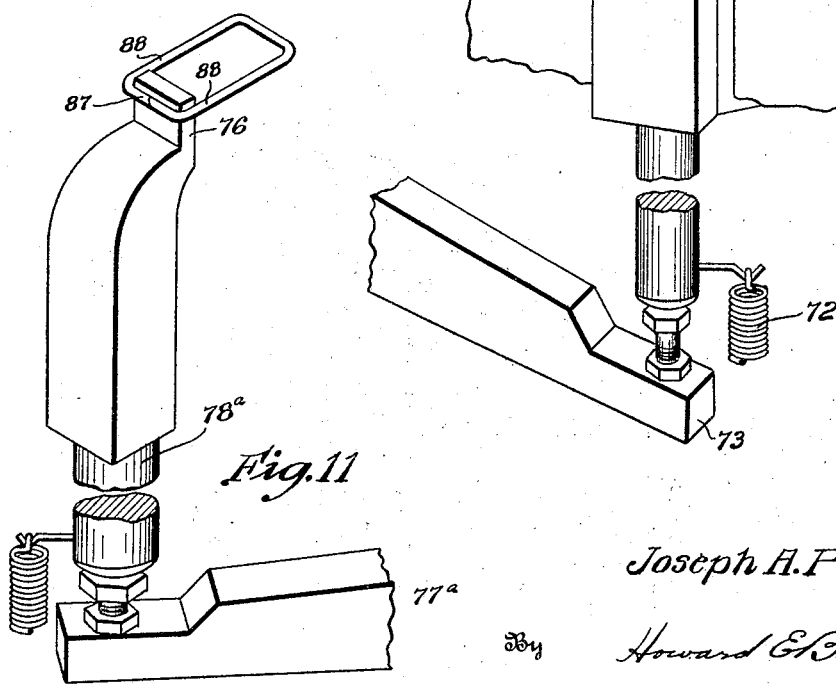
Inventor
Joseph A. Payette
By Howard E. Barlow
Attorney Jan. 8, 1924.                                                      1,479,870
                          J. A. PAYETTE
                       CHAIN MAKING MACHINE
                      Filed Jan. 25, 1922           7 Sheets-Sheet 5
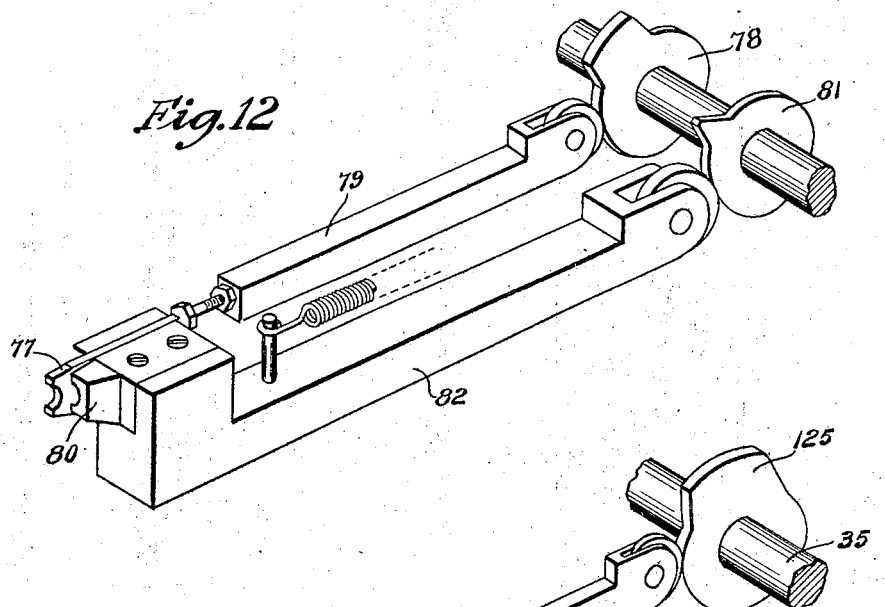
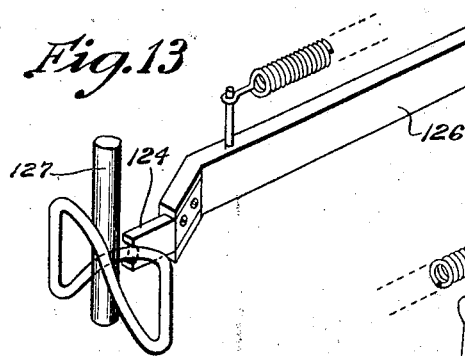
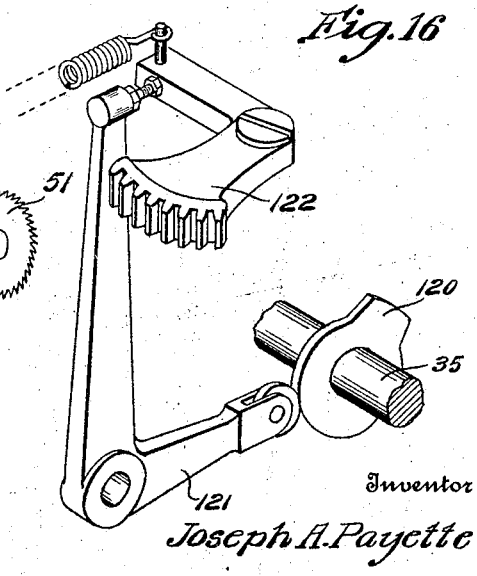
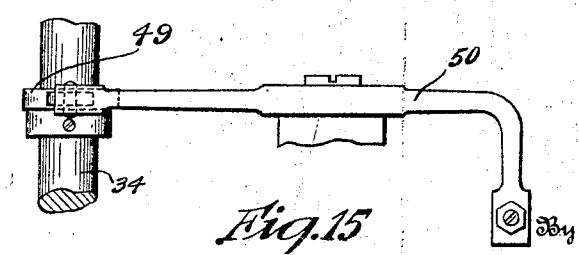
Inventor
Joseph A. Payette
By Howard E. Barlow
       Attorney Jan. 8, 1924.
J. A. PAYETTE
1,479,870
CHAIN MAKING MACHINE
Filed Jan. 25, 1922    7 Sheets-Sheet 6
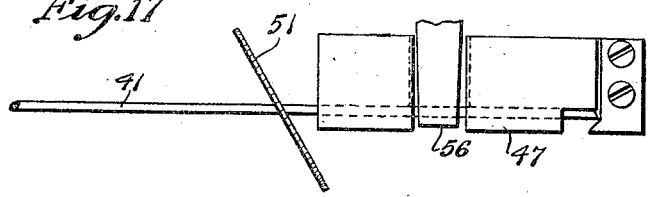
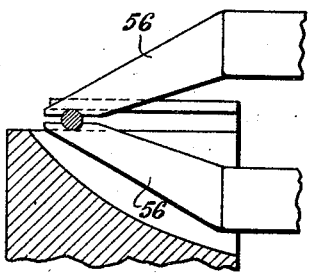
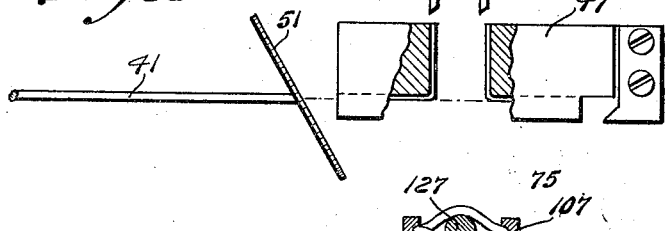
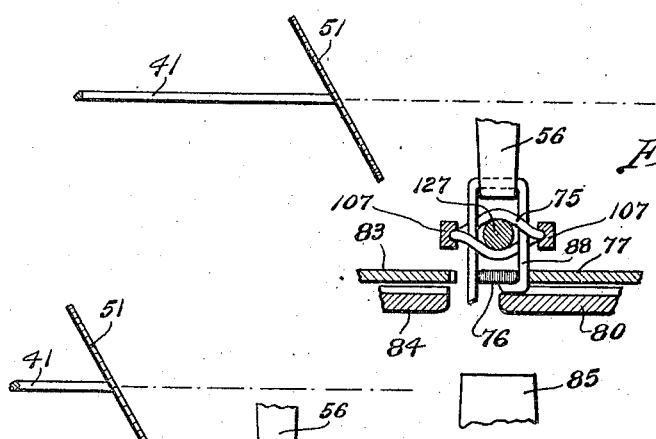
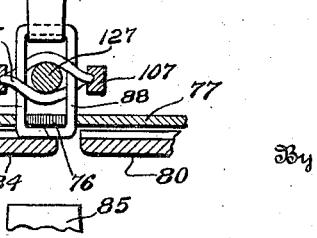
Inventor
Joseph A. Payette
By Howard E. Barlow
Attorney Jan. 8, 1924.  
J. A. PAYETTE  
CHAIN MAKING MACHINE  
Filed Jan. 25, 1922  
1,479,870  
7 Sheets-Sheet 7
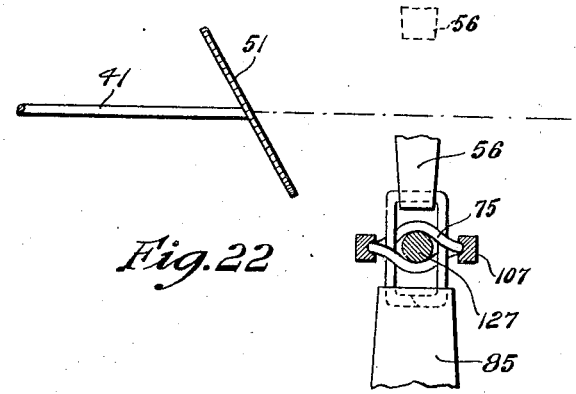
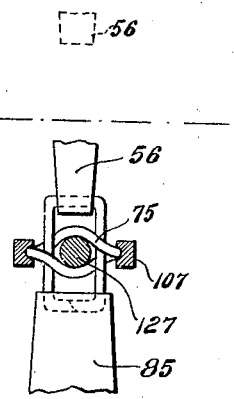
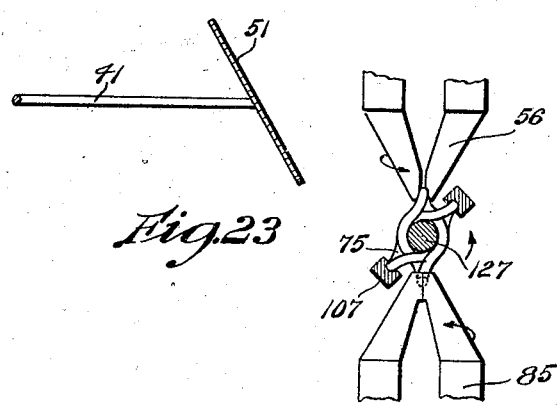
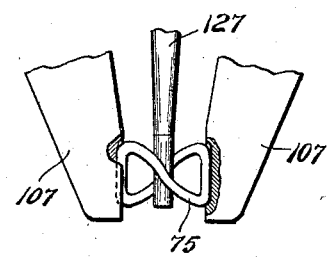
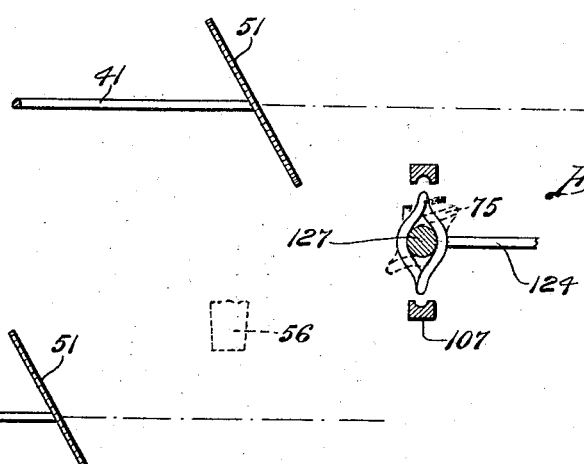
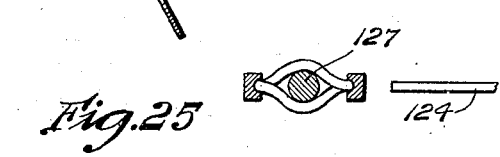
Inventor  
Joseph A. Payette  
By Howard E. Barlow  
Attorney Patented Jan. 8, 1924.

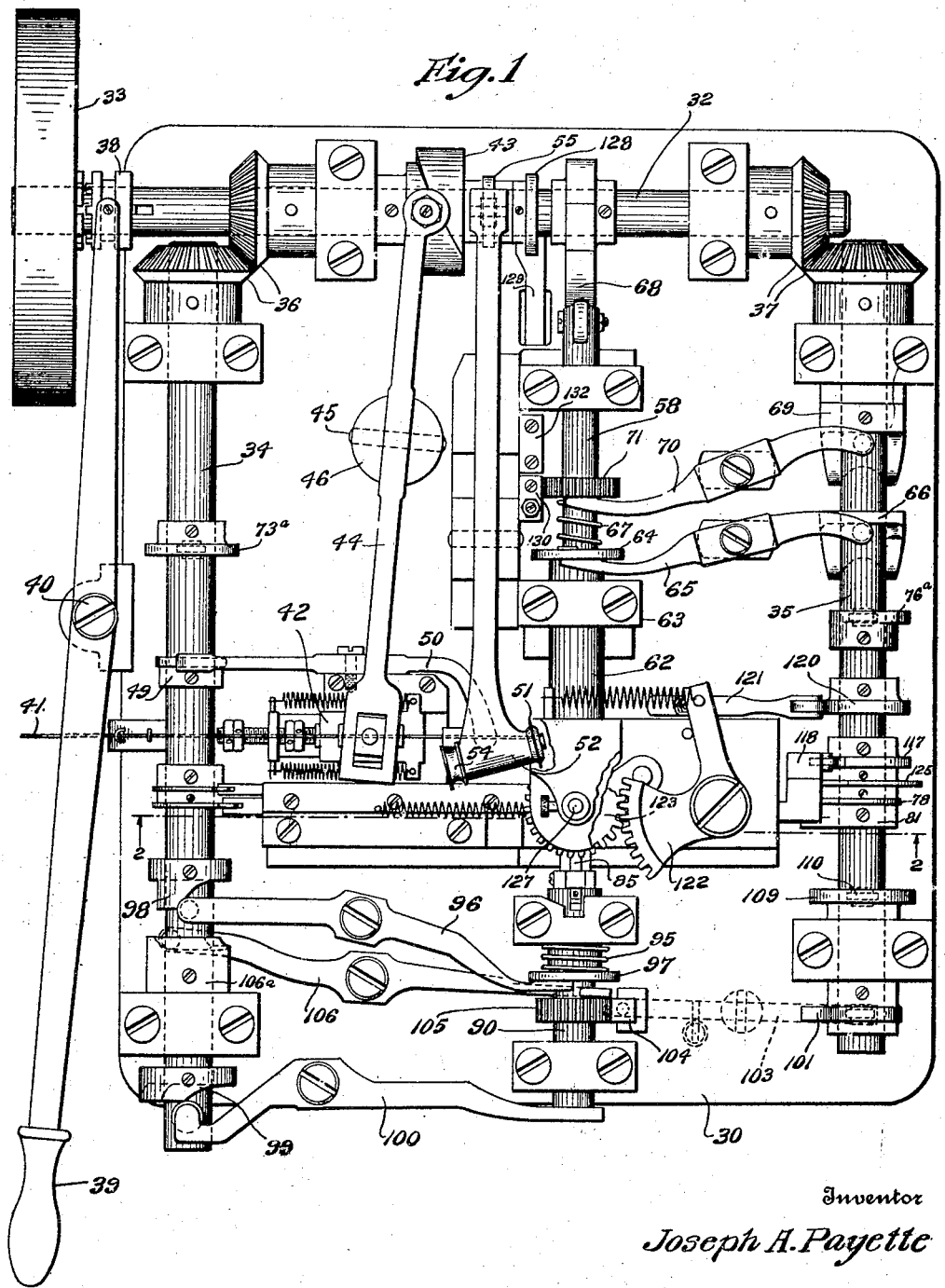

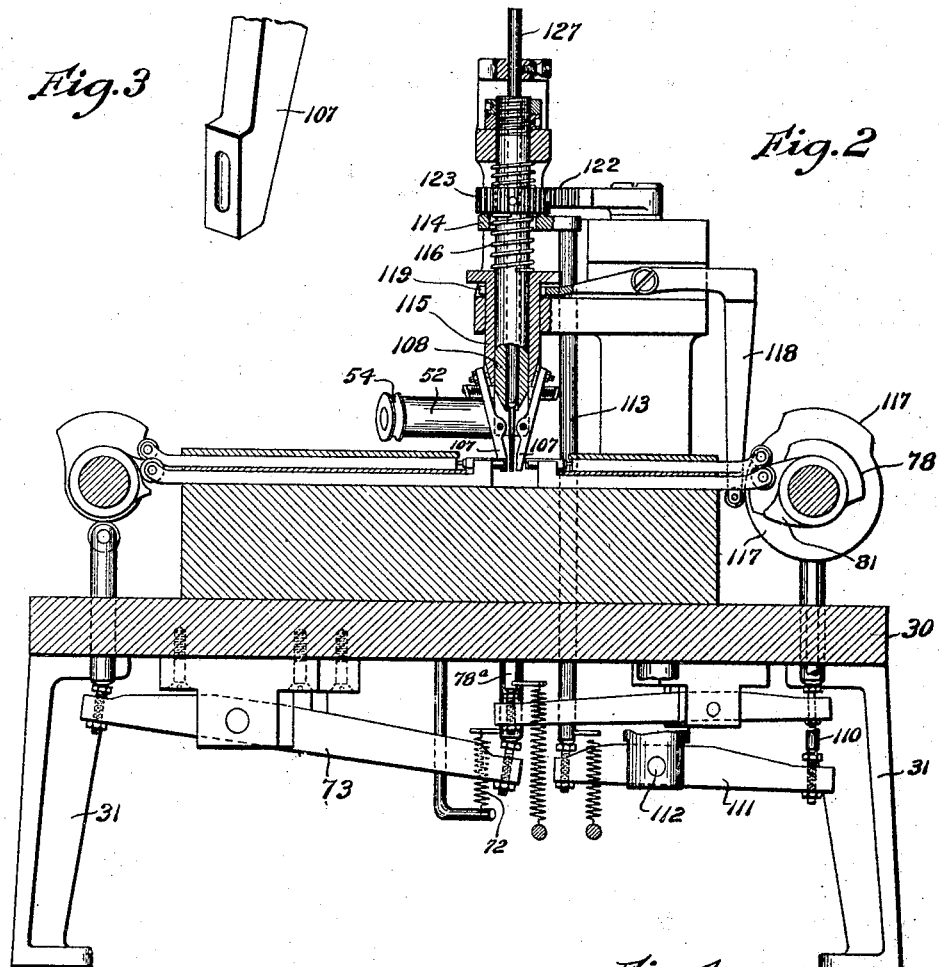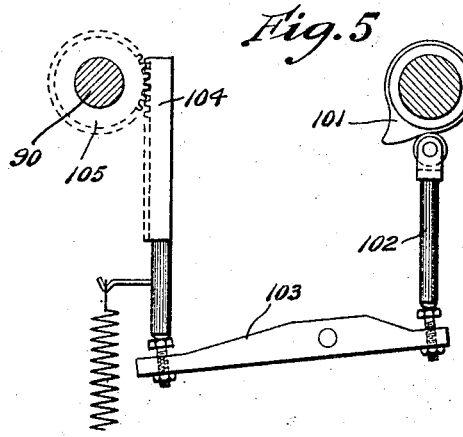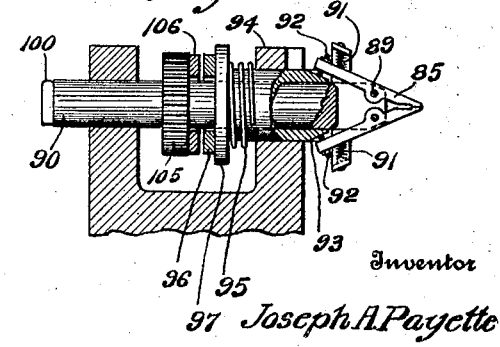

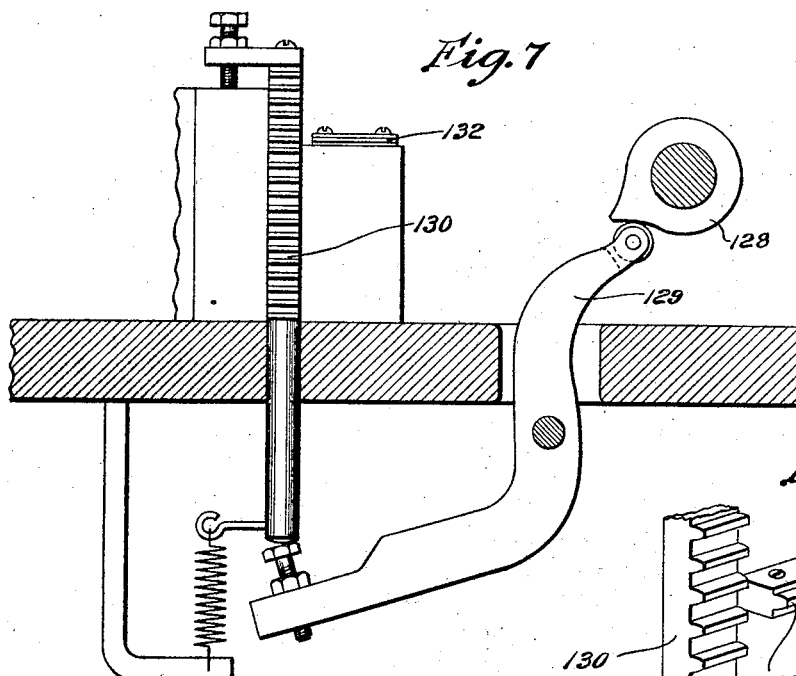
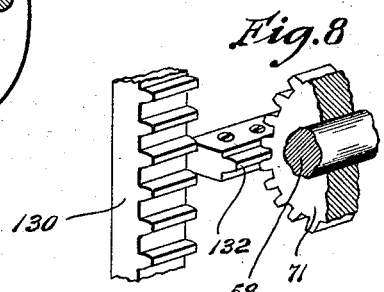
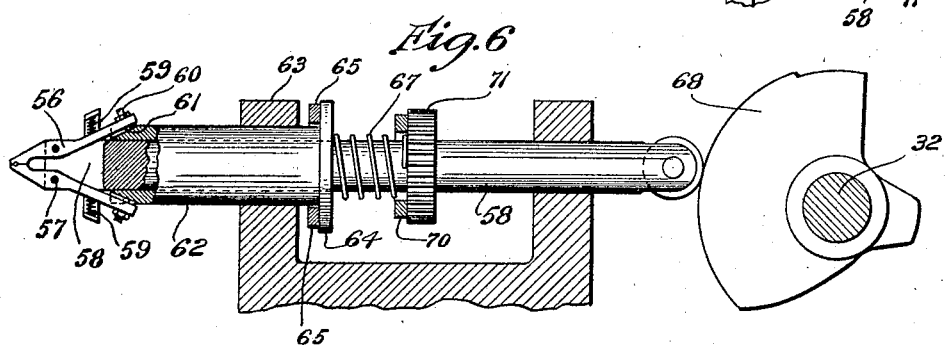
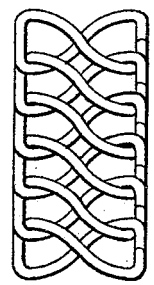
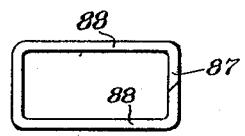

1,479,870

UNITED STATES PATENT OFFICE.

JOSEPH A. PAYETTE, OF ATTLEBORO, MASSACHUSETTS, ASSIGNOR TO S. O. BIGNEY & COMPANY, OF ATTLEBORO, MASSACHUSETTS, A CORPORATION OF MASSACHUSETTS.

CHAIN-MAKING MACHINE.

Application filed January 25, 1922. Serial No. 531,816.

*To all whom it may concern:*

Be it known that I, JOSEPH A. PAYETTE, a citizen of the United States, residing at Attleboro, in the county of Bristol and State of Massachusetts, have invented certain new and useful Improvements in Chain-Making Machines, of which the following is a specification.

This invention relates to machines for automatically making chain of the class more particularly adapted for personal wear, and the object of this invention is to provide such a machine adapted to continuously and automatically make chain from wire and to twist or curb the links of the chain and to connect each link at both ends to the one preceding whereby the length of the links is disposed transversely of the chain, which construction of chain has heretofore been produced by a so-called hand operation.

A further object of the invention is to so grip the link in curbing the same that the joint end of the link is locked against spreading during the curbing operation thus obviating the necessity of soldering the links during the construction of the chain.

With these and other objects in view, the invention consists of certain novel features of construction, as will be more fully described, and particularly pointed out in the appended claims.

In the accompanying drawings.

Figure 1 is a plan view of the machine.

Figure 2 is a sectional side elevation on line 2—2 of Figure 1.

Figure 3 is a perspective view showing a portion of one of the link-supporting vertical jaws.

Figure 4 is an elevation partly in section showing the mechanism for operating the link joint supporting and curbing jaws.

Figure 5 shows the mechanism for imparting the curbing action to the front jaws.

Figure 6 is an elevation partly in section showing the mechanism for operating the rear link-engaging jaws.

Figure 7 shows the mechanism for imparting the curbing action to the rear jaws.

Figure 8 shows the guiding means for preventing rotation of the rear jaw spindle during the staple forming and positioning operation.

Figure 9 is a perspective view showing the front and rear link-gripping jaws in position to engage and curb the link.

Figure 10 is a perspective view showing the rear forming post by which wire is formed into a staple by being drawn therethrough by a backward movement of the rear jaws.

Figure 11 shows the front post or anvil about which the free ends of the link are bent to close them.

Figure 12 is a perspective view showing the laterally movable mechanism for first engaging the binding side arm of the link against the anvil and then bending the end of the link across the front of the anvil.

Figure 13 is a perspective view illustrating the means for engaging the link and pressing it against the vertically disposed center arbor during the period it is released by the curbing jaws and engaged by the vertically positioning jaws.

Figure 14 is a sectional side elevation illustrating the wire feed binding device also showing the saw as being set on an angle to the axis of the wire for severing the link length therefrom.

Figure 15 is a top view showing the mechanism for operating the auxiliary wire-binding block.

Figure 16 is a perspective view illustrating the mechanism for rotating the vertically-disposed link-positioning jaws.

Figure 17 shows the wire as being fed across the rear forming post and the severing saw as being set on an angle to the axis of the wire.

Figure 18 shows the rear link forming jaws as having drawn the length of wire through the forming post to shape the same into a staple.

Figure 19 shows the rear jaws as having advanced the staple through the next previously formed link and also showing one of the ends of the staple as bent across the face of the anvil.

Figure 20 shows the second end of the link as having been bent across the face of the anvil to cause the two ends to abut.

Figure 21 is a side elevation of the rear or staple forming jaws also showing a portion of the rear forming post in section.

Figure 22 shows the front curbing jaws as having gripped the joint end of the link and in position to be rotated to curb the same.

Figure 23 shows the rear and front jaws as having been rotated 90° in opposite directions to curb the link also showing the next previously formed link as having been rotated 45° by the vertical positioning jaws so that this link will not interfere with the curbing operation.

Figure 24 shows the vertical positioning jaws as having released the link next previously formed and as having been rotated into position to engage the last link formed, said last link being held against the center anvil by a lateral bending grip.

Figure 25 illustrates the link shown in Figure 24 as having rotated 90° by the vertical positioning jaws, into position to receive the legs of the staple of the next link.

Figure 26 is a side elevation showing a portion of the vertical positioning jaws as engaging the ends of one of the links also showing the arbor or post through the center of the link.

Figure 27 shows a link before being curbed.

Figure 28 shows this link after having been curbed.

Figure 29 shows a section of chain formed by the links which are caused to engage each other at both ends, the greatest length of the links lying transversely of the chain.

It is found in practice to be of advantage to form a chain of links which set with their greatest length transversely of the chain and which engage the other links at both ends thereof and to also form this chain continuously and automatically and to so operate upon the links that they may be curbed before they are soldered and at the same time maintain practically perfect abutting ends at the joint of each link, whereby the chain thus formed may be subsequently passed through an automatically soldering apparatus if desired by quickly uniting the joint ends of the links.

In the constructing of a chain of this character it is found that usually the links must be soldered prior to being curbed which is a great disadvantage owing to the fact that the machine must necessarily run very slowly in order to give the soldered link time to cool before it is curbed, but by the use of my improved machine where a chain is formed before the links are soldered, I am enabled to run the machine very rapidly and, therefore, materially reduce the expense of constructing the chain, and the following is a detailed description of one means by which these advantages may be obtained:—

With reference to the drawings, 30 designates the bed-plate of the machine which is shown as being supported on legs 31 and on this bed-plate I have located a main drive shaft 32 driven through pulley 33, and I have also provided parallel side shafts 34 and 35 on opposite sides of the machine which are driven from the main shaft through miter gears 36 and 37, respectively.

The stopping and starting of these shafts may be controlled by a clutch 38 through the operating lever 39 which is pivoted at 40 on the bed-plate.

The wire 41 is fed to the machine from a reel (not shown) by means of the usual reciprocating clamp block 42 operated from the cam 43 through lever 44 pivoted to oscillate vertically on the pivot pin 45 and to oscillate horizontally on the pivot 46 whereby the rotation of cam 43 imparts a feeding action to the block to advance the required length of wire across the rear post 47, see Figure 17, and after having been fed the desired length the wire is gripped by the auxiliary binding block 48 by the cam 49 through the action of lever 50 to hold the wire during the return action of the feed block and also during the cutting off operation by saw 51 which saw is preferably set on an angle to the axis of the wire to sever the end obliquely for the purpose hereinafter described.

The saw is mounted in the head 52 and is rapidly rotated by a belt (not shown) engaging the grooved pulley 54 and this saw is raised and lowered into and out of contact with the wire by action of cam 55.

When this length of wire has been positioned across the rear post 47 it is engaged by the rear jaws 56 which are pivoted at 57, see Figure 6, on the spindle 58 and are normally pressed to open position when so permitted by the sleeve presently described, by springs 59. The ends of the jaws are provided with adjustable screws 60 which rest against the inclined surface 61 of this sleeve 62, which sleeve has a bearing in the block 63 and is provided with a flange 64 which is engaged by a lever 65, see Figure 1, to be operated through the action of cam 66 to move this sleeve back against the tension of spring 67 and so permit the jaws to be opened by the spring 59 to engage or release the end of the link.

After the wire has been fed across the post, as illustrated in Figure 17, the first action of these jaws is to open by an inward movement of the spindle 58 relative to the sleeve 62 through action of cam 68 to engage this length of wire. The lever 65 under action of its cam 66 and spring 67 now permits the sleeve to advance and close the jaws upon the wire, and the jaws now having grasped the wire are caused to recede by action of the cam 69 through lever 70 which acts upon the face of the gear 71 causing the length of wire to be drawn out into staple form, as illustrated in Figure 18. The post 47 is now depressed or drawn downwardly by spring 72 by the dropping of lever 73 by action of cam 73$^a$ after which the jaws 56 with their staple 74 are advanced under action of the cam 68 from the position shown in Figure 18, to pass the legs of the staple through the opposite ends of the previously formed link 75 and into the position illustrated in Figure 19 in which the ends of the link are caused to extend beyond the anvil 76. The next operation is to bend these end portions across the front face of this anvil 76 alternately towards each other and in order to accomplish this in a satisfactory manner I provide a gripping member 77, see Figure 12, which first advances and binds the side bar of the staple against the side edge of the anvil under action of the cam 78 through the connector 79. I next advance the binding jaw 80 through the action of cam 81 and connector 82 to turn one end of the staple across the face of the anvil jaw 80 being at once withdrawn. The opposite end of the staple is subsequently acted upon in a similar manner by means of the gripping member 83 and bending member 84, the binding member 77 remaining in engaged position during the withdrawal of bender 80 and the gripping and bending actions of gripper 83 and bender 84.

The reason for turning these ends alternately is due to the fact that they are cut on an angle and one must, therefore, lie upon the other and, therefore, one must be positioned in advance of the other.

After these ends have been turned inwardly to abut or lie against each other, as illustrated in Figure 20, these binding and bending members are withdrawn and the anvil post 76 dropped by action of cam 76$^a$ through lever 77$^a$ and its post 78$^a$ permitting the second gripping jaw 85 to advance as shown in Figure 22 and engage the joint portion of this link in such a way as to prevent the abutting ends from separating during the subsequent curbing operation. To accomplish this I have constructed this pair of jaws of a width greater than that of the link and in the faces of these opposite jaw members I have formed grooves 86 each of a depth substantially one-half the diameter of the wire whereby when these jaws are closed upon the joint end of the link they embrace the front bar 87 and portions of the side bars 88 whereby it is absolutely impossible for the joint ends of the link to separate during the curbing operation upon the link which is formed by oppositely rotating the opposite end jaws 85 and 56. The rear jaw is rotated when in this advanced position by the cam 128 acting through lever 129 and rack 130 on the pinion 71 on the jaw-carrying spindle 58, which pinion is at this time in engagement with this rack, being moved forward from engagement with its key 132 which holds it against rotation while in its rear position.

The front jaws are similar in their action to the rear jaws in that they are pivotally mounted at 89 in the spindle 90 their free ends being normally pressed inwardly by springs 91 and these ends are provided with adjustable screws 92 to rest against the inclined surface at the end of the sleeve 93, which sleeve is slidably mounted in the bearing 94 and is adapted to be pressed inwardly against tension of spring 95 by means of the lever 96 acting against collar 97 through the operation of cam 98 whereby when it is desired to advance these jaws the spindle 90 is forced inwardly by action of cam 99 through lever 100, see Figure 1, and when these jaws are to close upon the link the lever 96 is forced inwardly causing the inclined surface of the sleeve to close the jaws upon the link. When these jaws have been advanced and closed upon the link the spindle 90 is caused to be rotated in a direction opposite to that of the rear jaws and simultaneously therewith by action of cam 101 through connection 102, lever 103, rack 104 and pinion 105 whereby this jaw is caused to cooperate with the jaw engaging the opposite end of the link to twist both ends simultaneously in opposite directions.

Owing to the fact that the link is shortened during its twisting action both of the jaw spindles are caused to advance slightly under action of their respective controlling cams to compensate for this shortening of the link.

The link is now released from both pairs of jaws by action of their respective cams. The lever 106 is now caused to act against the inner face of the pinion 105 by cam 106$^a$ to return the operating parts of its jaw back to normal while the lever 106 acts upon the gear 105 to move the jaw-controlling mechanism back to the starting position.

In order to position the next previously curbed link 75 so as not to interfere with the curbing of the last link. I have provided a pair of vertically-disposed jaws 107, see Figures 2 and 3 and 26, which are pivotally mounted on the spindle 108 which receives a relative endways motion through cam 109, rod 110, lever 111, pivoted at 112, rod 113 and fork 114. The upper ends of these jaws are controlled in their opening action by means of the sleeve 115 which is caused to act against the spring 116 by cam 117 through the lever 118 and fork 119.

This jaw-operating mechanism above described causes the jaws 107 to close upon the next previously formed link 75 and rotate it 45° into the position illustrated in Figure 23 so as to prevent this link from interfering with the curbing action of the last link.

This rotating action of these jaws is obtained from the cam 120 see Figure 16, lever 121 and segment 122 which engages the pinion 123.

The next operation is to advance the gripping member 124 through the action of cam 125 and bar 126 to engage the last formed link and press it against the side of the supporting arbor 127 which passes through the spindle 108, permitting this link to now be released by the curbing jaws and also permit the previously formed link to be released by the supporting jaws 107, after which the curbing jaws are removed to their normal or starting position, as above described. The vertical or supporting jaws 107 are now rotated into position illustrated in Figure 24 and are then closed upon the ends of the last formed link to rotate it back into position illustrated in Figures 25 and 18 ready to receive the legs of the next staple, which are passed therethrough before being bent to close their open ends thus completing the cycle of operations necessary for forming a chain continuously and automatically by my improved mechanism.

It will be noted that I sever the wire on an oblique angle to its axis which has a number of advantages over the severing at a right angle to its axis, among others being first, that a greater soldering surface or area is presented by the angular abutting ends, thereby forming a stronger joint than would be the case when it is sawed at right angles; second, the sharp pointed ends of the staple formed by this angular cut facilitate the passing of the staple ends through the next previously formed link without catching the same; and third, the making of a tight joint is rendered more certain as a slight movement of the ends out of their axial alinement will not cause these ends to separate or open as is the case where a right-angled cut is made.

After the chain is finished it may be subjected to a soldering process which causes the solder in the core of the wire to flow out and unite the ends of the links after which it is treated by rolling or otherwise to shape it in any desired form to produce chains of most attractive designs.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:
1. In a chain machine, a die member, means for advancing a length of wire across said member, means for severing the advanced length, a pair of jaws, means for causing said jaws to grip the severed length of wire and draw it back through said die to form a staple, means for gripping and holding the next previously formed link, means for advancing said jaws to pass the legs of the staple through said formed link, an anvil, and means including laterally-movable bending members for closing the free ends of the staple about said anvil to form a link.

2. In a chain machine, a die member, means for advancing a length of wire across said member, means for severing the advanced length of wire, a pair of jaws, means for causing said jaws to grip the severed length of wire and draw it back through said die to form a staple, means for gripping and holding the next previously formed link, means for advancing said jaws to pass the legs of the staple through said formed link, an anvil, means for closing the free ends of the staple about said anvil to form a link, a curbing jaw for engaging the closed end of said link, and means for rotating the jaws at both ends of the link in opposite directions to curb the link.

3. In a chain machine, means for advancing and severing a length of wire, means for bending said wire length into a link, a pair of positioning jaws, an arbor means for positioning the same in said link before curbing, and rotatable jaws for engaging opposite ends of said link to curb the same, and means cooperating with said arbor for retaining and supporting the last curbed link during the time it is released by the curbing and engaging of the positioning jaws.

4. In a chain machine, means for advancing and severing a length of wire, means for bending said wire length into a link, a pair of positioning jaws, a supporting arbor means for positioning the same in said link before curbing and two sets of oppositely rotatable jaws each adapted to engage opposite ends of said link to twist and curb the link simultaneously in opposite directions, and a retaining member cooperating with said arbor for supporting the last curbed link during its release by the curbing and engagement by said positioning jaws.

5. In a chain machine, means for advancing and severing a length of wire, means for bending said wire length into a link, a pair of positioning jaws, a supporting arbor means for positioning the same in said link before curbing, and two sets of oppositely rotatable jaws each adapted to engage opposite ends of said link to twist and curb the link simultaneously in opposite directions, and a retaining member cooperating with said arbor for supporting the last curbed link during its release by the curbing and engagement by said positioning jaws, and means in the twisting jaws for preventing the spreading of the joint edges of the link during the curbing operation.

6. A method of forming a chain, which consists in bending a length of wire into link form, tightly gripping the closed end of the link, gripping the jointed end of the link in jaws that are grooved transversely and longitudinally to incase the joint bar and a portion of the side bars of the link, rotating said link ends in opposite directions to curb the link, said grooved portions of the jaws serving to positively prevent the joint ends from spreading during the curbing operation.

7. In a chain machine, means for advancing and severing a length of wire, means for bending the wire length into a link, a pair of oppositely rotatable jaws for engaging opposite ends of the link, one of said pairs of jaws being recessed to receive, inclose and grip the jointed bar of the link and a portion of the side bars of the link whereby the jointed portion of this end of the link is positively prevented from spreading 8. In a chain machine, means for advancing and severing a length of wire, means for bending the wire length into a link, a pair of oppositely-rotatable jaws for engaging opposite ends of the link, and means for gripping the joint bar of the link and also for engaging the side bars of the link adjacent the jointed end to positively prevent the joint ends from separating during the curbing operation.

9. In a chain machine, means for advancing and severing a length of wire, means for bending the wire length into a link, a pair of oppositely-rotatable members for engaging opposite ends of a link, one of said members being provided with a pair of jaws, each of said jaws being provided with cooperating grooves for receiving and grasping the joint bar of the link and also for engaging the side bars of the link adjacent the jointed end to positively prevent the jointed ends of the link from separating in any direction during the curbing operation.

10. In a chain machine, means for advancing and severing a length of wire, means for bending the wire length into a link, a pair of oppositely-rotatable jaws for engaging opposite ends of the link, one of said pairs of jaws being of a width greater than that of the link it engages the faces of the opposite jaws being grooved each to a depth substantially one-half the diameter of the link wire whereby when these jaws are closed upon the joint end of the link they will grip and bind and prevent the ends from separating during the curbing operation, and means for rotating the said jaws to curb the link.

11. In a chain machine, a die member, means for advancing a length of wire across said member, means for severing the advanced length of wire, a pair of jaws, means for causing said jaws to grip the severed length of wire and draw it back through said die to form a staple, means for gripping and holding the next previously formed link means for advancing said jaws to pass the legs of the staple through said formed link, an anvil, a laterally movable means for closing the free ends of the staple about said anvil to form a link.

12. In a chain machine, a die member, a means for advancing a length of wire across said member, means for severing the advanced length, a pair of jaws, means for causing said jaws to grip the wire and form the same into a staple, means for gripping and holding the next previously formed link means for advancing said staple to pass its legs through said formed link, an anvil, and laterally movable means for bending the free ends of the staple alternately about said anvil to form a link.

13. In a chain machine, a die member, means for advancing a length of wire across said member, means for severing the advanced length of wire on an angle to its axis, means for gripping and holding the next previously formed link means for bending the severed length into a staple form and passing the legs of the staple through said formed link, and means for closing the free ends of the staple to cause the angled faces to engage each other.

14. In a chain machine, a die member, means for advancing a length of wire across said member, means for severing the advanced length of wire on an angle to its axis, means for gripping and holding the next previously formed link, means for bending the severed length into staple form and passing the legs of the staple through said formed link, means for curbing the link, and means for preventing the joint ends of the link from opening during the curbing operation.

15. In a chain machine, a die member, means for advancing a length of wire across said member, means for severing the advanced length of wire on an angle to its axis, means for gripping and holding the next previously formed link means for bending the severed length into staple form and passing the legs of the staple through said formed link, an anvil, laterally movable means for first binding the side bar of the staple against said anvil and subsequently bending the ends across said anvil.

16. In a chain machine, means for advancing and severing a length of wire, means for gripping and holding the next previously formed link means for bending said wire length into a staple form and advancing the legs of the staple through said formed link, an anvil, a pair of laterally movable binding members to grip one of the legs of the staple against said anvil, and laterally movable members adapted to bend said ends alternately across said anvil to cause them to abut.

17. In a chain machine, a die member, means for advancing a length of wire across said member, means for severing the advanced length of wire on an angle to its axis, means for gripping and holding the next previously formed link means for bending the severed length into staple form and passing the legs of the staple through said formed link, an anvil, a pair of laterally movable members for binding said legs against said anvil, and a pair of movable bending members for alternately bending the ends of said legs across the face of said anvil to cause their ends to abut.

In testimony whereof I affix my signature.

JOSEPH A. PAYETTE.